May 16, 1944.  R. M. SHERMAN  2,348,934
COOKING STOVE
Filed March 29, 1941  2 Sheets-Sheet 1
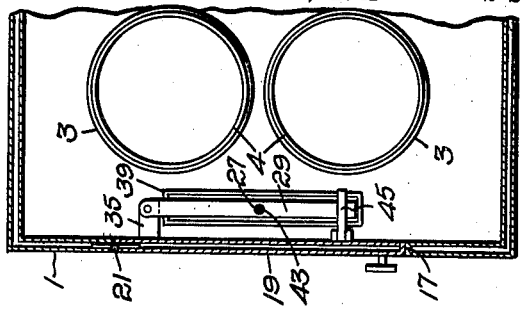
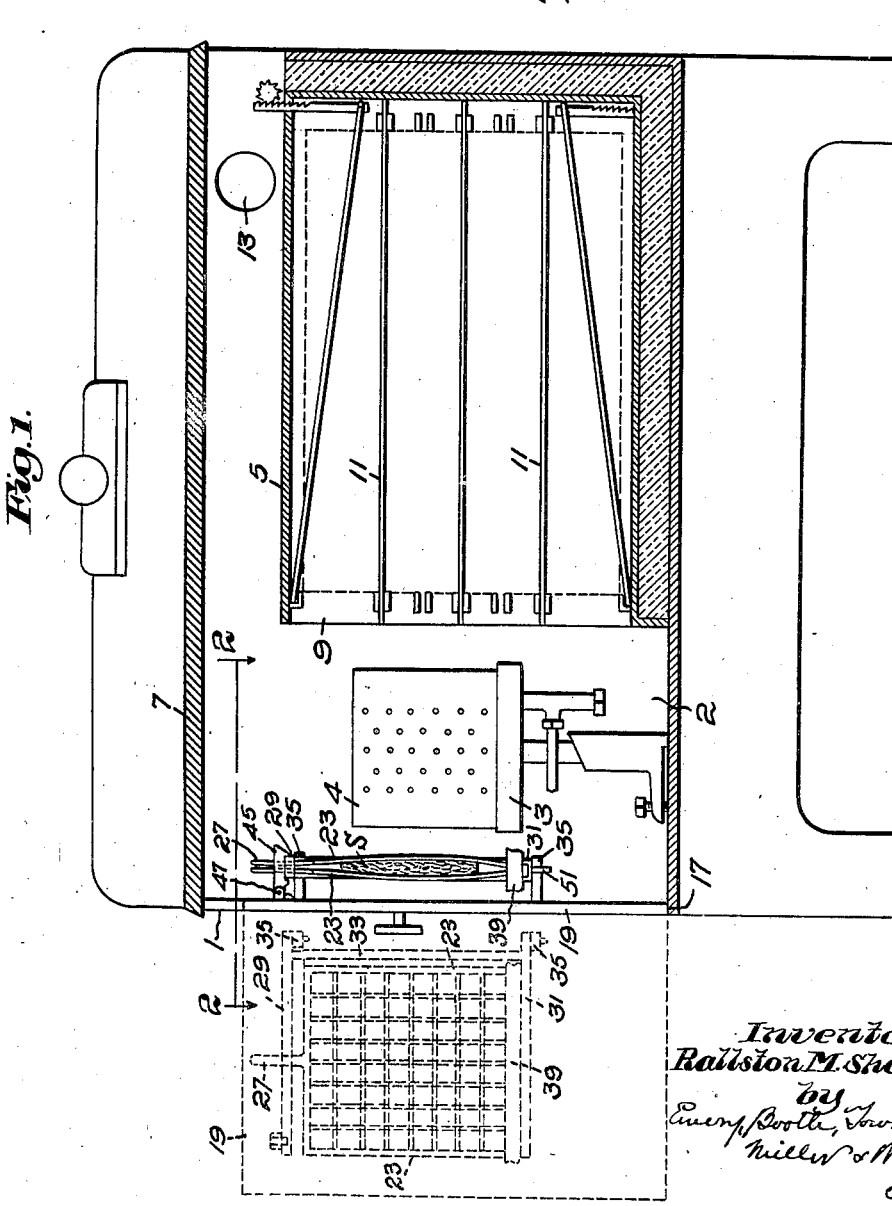
Inventor:
Ralston M. Sherman May 16, 1944.	R. M. SHERMAN	2,348,934
COOKING STOVE
Filed March 29, 1941	2 Sheets-Sheet 2
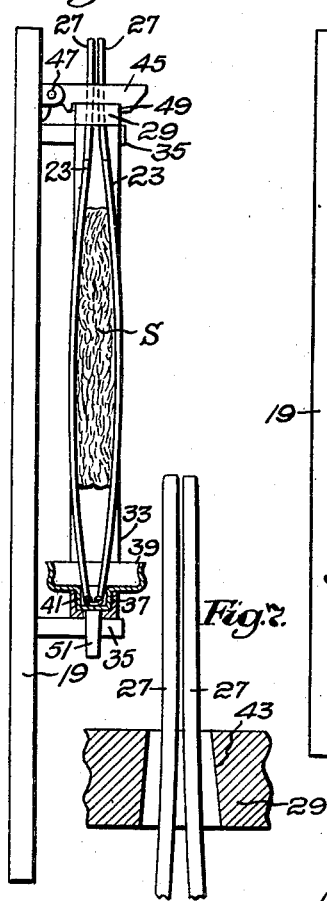
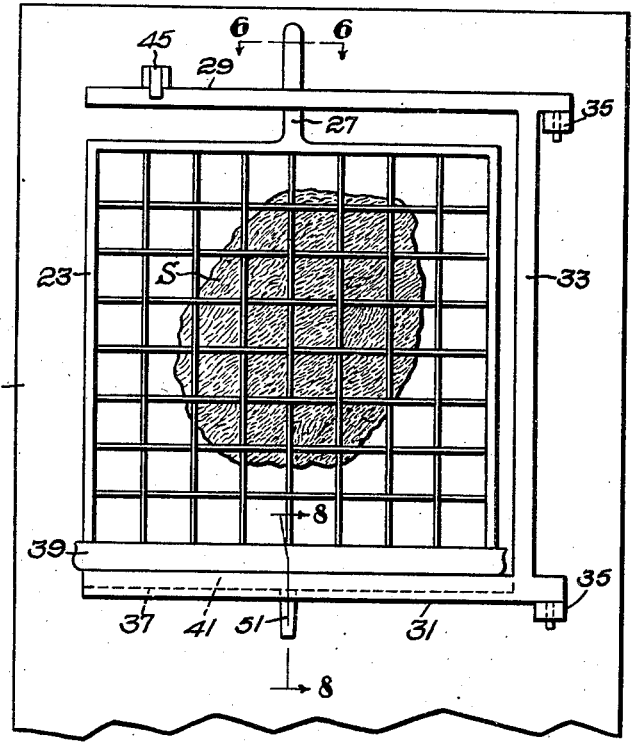
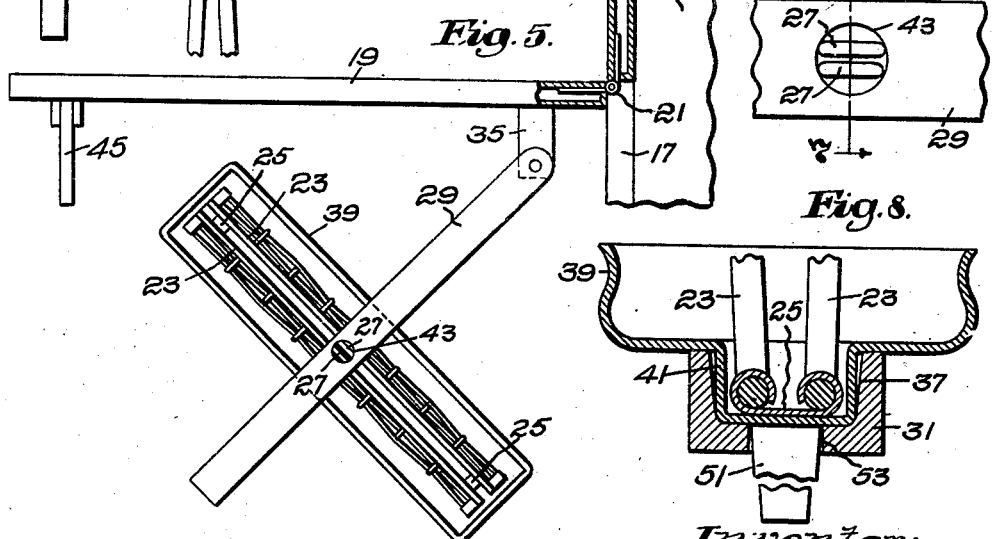
Inventor:
Rallston M. Sherman Patented May 16, 1944

2,348,934

UNITED STATES PATENT OFFICE 2,348,934

COOKING STOVE

Rallston M. Sherman, Glastonbury, Conn., assignor to The Silent Glow Oil Burner Corporation, Hartford, Conn., a corporation of Connecticut Application March 29, 1941, Serial No. 385,879

11 Claims. (Cl. 99—400)

My invention, which relates to stoves, and has among its objects the provision of a stove with a compact arrangement of cooking instrumentalities, particularly as relates to improved broiling means, will be best understood from the following description when read in the light of the accompanying drawings of an embodiment of the invention selected for illustrative purposes, while the scope of the invention will be more particularly pointed out in the appended claims.

In the drawings—

Fig. 1 is a longitudinal vertical section of a stove according to the invention;

Fig. 2 is a fragmentary section on the line 2—2 of Fig. 1;

Fig. 3 is an elevation, on an enlarged scale and with parts broken away, of the inner side of the door which carries the broiling means;

Fig. 4 is an end elevation of the parts according to Fig. 3;

Fig. 5 is a section on the line 2—2 of Fig. 1 on an enlarged scale, and with the parts in a different operative position from Fig. 2;

Fig. 6 is a section on the line 6—6 of Fig. 3 on an enlarged scale;

Fig. 7 is a section on the line 7—7 of Fig. 6; and

Fig. 8 is a section on the line 8—8 of Fig. 3 on an enlarged scale.

Referring to the drawings, the stove illustrated comprises a casing 1 having a chamber 2, in which latter are mounted oil burners 3 of the "range burner" type. These burners, which may be of any suitable construction, comprise the upwardly extending, perforated combustion tubes 4 which when the burners are in operation are heated to a red heat and form a source of heat for the grill or broiler hereinafter more fully described, the oven 5, and stove stop 7.

The oven may be of any suitable kind, and as shown is of the reflector type disclosed in applicant's co-pending application Serial Number 309,017, filed December 13, 1939, now Patent No. 2,314,249, issued March 16, 1943 the burner supplying radiant heat through the open end 9 of the oven to the cooking vessels placed on the racks 11, the products of combustion passing over the top and around the sides of the oven and escaping from the stove casing through the flue discharge opening 13.

Providing access to the chamber 2 from the exterior of the stove is a door opening 17 normally closed by a door 19, the door being mounted to swing about a vertical axis afforded by the hinges 21 at a vertical edge of the door opening. In the present embodiment of the invention this door carries a grill or broiler comprising the two rectangular reticulated members 23 hingedly connected by a link 25 at their lower edges and having at their upper edges upwardly extending handles 27, food such as a steak S being adapted to be held between these two members in the usual manner.

As shown, the grill is supported on the door by a frame comprising the upper horizontal arm 29 and lower horizontal arm 31, these arms being connected adjacent one of their ends by a vertical bar 33 formed integrally therewith, and at those ends being pivotally connected to lugs 35 fixedly carried by and projecting from the door, so that the arms may be swung relative to the door.

As shown, the lower horizontal bar 31 of the grill support is provided on its upper side with a longitudinally extending groove 37. Carried by the bar is a drip-receiver 39, the bottom of which has a longitudinally extending trough-like projection 41 (Fig. 8) received in the groove 37. This trough-like projection is adapted to receive the lower hingedly connected portions of the rectangular grill members 23, while the handles 27 of the grill members are adapted to project through an opening 43 (Fig. 7) of circular cross-section formed in the upper horizontal bar 29 of the grill support.

Normally the grill support is held in the position, relative to the door 19, illustrated by Figs. 3 and 4 by a latch bar 45 pivotally mounted for vertical swinging on the door at 47, the latch bar having a notch 49 for engaging the upper arm 29 of the grill support. When in this position the grill is prevented from rotating relative to the grill support by the interior lateral walls of the trough-like projection 41 of the drip-receiver, which projection receives the lower edges of the grill members 23, while the drip-receiver is prevented from rotating relative to the grill support by reason of the trough-like projection 41 thereof being received in the groove 37 in the lower arm 31 of the grill support.

For permitting the grill and drip-receiver to be rotated when desired relative to the grill support, the drip-receiver, as shown, is provided with a downwardly projecting pin 51 of circular cross-section formed integrally therewith, this pin being adapted to be received in the perforation 53 of circular cross-section formed in the arm 31. When the grill is to be turned, to present the opposite side thereof to the source of broiling heat afforded by the glowing combustion tubes of the burners, the door 19 may be swung open, say to its dotted line position shown in Fig. 1 corresponding to its full line position shown in Fig. 5, and then the grill support may be unlatched by raising the latch bar 45, whereupon the grill support may be swung on its pivotal connections to the door, say to its position shown in Fig. 5. The drip-receiver may then be raised to move the trough-like projection 41 thereof out of the groove 37 on the upper side of the lower arm 31 of the grill support, the upper edges of the grill members 23 coacting with the under side of the upper arm 29 to prevent the pin 51 of the drip-receiver from pulling out of the perforation 53 in the lower arm, whereupon the drip-receiver may be swung through 180° about the pin 51 as a pivot, an intermediate position of the drip-receiver being indicated in Fig. 5. After being so swung the trough-like projection 41 of the drip-receiver may be again lowered into the groove 37 of the lower arm 31 of the grill support so as non-rotatably to secure it to this arm. The grill is forced to turn with the drip-receiver during this operation by reason of the lower edge portions of the grill being received in the trough-like projection 41. The opening 43 in the arm 29 being circular permits the handles 27 to rotate therein while the grill is being turned relative to the grill support.

It will be understood that by mounting the grill or broiler on the door of the chamber which contains the oil burners permits a compact arrangement of parts, yet the grill may be readily turned when the door is opened to remove the grill from the chamber which contains the oil burners, and during this turning operation no drip will fall to the floor because the drip-receiver is always beneath the grill while it is being turned. It will also be understood that the grill can be readily removed, for inserting and removing the food carried thereby and for cleaning it, by sliding it upward to remove its lower edge portion from the trough-like projection at the bottom of the drip-receiver to position that edge well above the trough in that projection, the handles 27 being longitudinally slidable in the tapered opening 43 in the arm 29 and the space between that arm and the upper edge of the grill permitting such upward movement. Then the grill may be swung sidewise to move its lower edge past the side wall of the drip-receiver 39, this swinging being permitted by the yielding fit of the handles in the tapered opening 43, and when so swung to said position the grill may be moved downward to remove the handles from the opening 43. When the grill is thus removed the drip-receiver may be readily removed from the arm 31 by lifting it upward to withdraw the pin 51 from the perforation 53 in the arm 31. All of these operations may be performed when the door is open and the parts carried thereby are readily accessible.

It will be understood that, within the scope of the appended claims, wide deviations may be made from the form of the invention described without departing from its spirit.

I claim:

1. The combination with means forming a broiling chamber containing a source of broiling heat, of a door for said chamber, a grill mounting on said door for positioning a grill carried thereby in operative relation to said source when said door is closed, said mounting comprising a support carried by said door in movable relation thereto, which support is provided with means for movably mounting a grill thereon permitting a grill so mounted to be turned relative to said door to present either side of the grill to said source, said support having a position of movement in which it positions the grill relatively close to said door and having a position of movement far enough from said door to permit a grill mounted on said support to be so turned when said door is opened.

2. The combination according to claim 1 in which the door swings about a vertical axis adjacent one edge thereof, and the support is mounted on the door for swinging about a vertical axis adjacent one side of the support.

3. The combination with means forming a broiling chamber containing a source of broiling heat, of a door for said chamber, means for mounting a grill on said door in operative relation to said source when said door is closed comprising a support adapted rotatably to carry a grill so that by rotation of the latter relative to said support either side of the grill may be presented to said source, said support being movably mounted on said door for movement toward and away from it so that it has a position of movement close to said door to position the grill, when the door is closed, in operative relation to said source and has a position of movement sufficiently far from said door when the latter is opened to permit the grill to be so rotated.

4. The combination with means forming a broiling chamber containing a source of broiling heat, of a door for said chamber, means for mounting a grill on said door in operative relation to said source when said door is closed comprising a support movably mounted on said door for movement toward and away from it, said support also comprising a grill attaching part movably mounted thereon for turning the grill to present either side thereof to said source, said support having a position of movement in which it positions the grill relatively close to said door and having a position of movement far enough from said door to permit the grill to be so turned by movement of said part.

5. The combination according to claim 4 in which the support is swingingly mounted on the door adjacent one edge of said support, and the grill attaching part is rotatably mounted on said support.

6. The combination according to claim 4 in which the door and support are mounted for swinging about vertical axes, and the grill attaching part is formed to provide a drip-receiver.

7. The combination according to claim 4 in which the grill attaching part is formed to provide a drip-receiver and is mounted on said support for swinging about a vertical axis, the door also being mounted for swinging about a vertical axis, and the support being mounted on the door for swinging about a vertical axis adjacent one side of the support.

8. The combination with means forming a broiling chamber containing a source of broiling heat, of a door for said chamber, a support for mounting a grill on said door in operative relation to said source when said door is closed comprising means swingingly mounted on said door and presenting spaced parts extending across the door, a grill attaching member swingingly mounted on one of said parts adapted non-rotatably to engage a grill at one edge portion of the grill, the other of said parts having provision for rotatable attachment thereto of the grill adjacent the opposite edge portion of the grill.

9. The combination with means forming a broiling chamber containing a source of broiling heat, of a door for said chamber, a support for mounting a grill on said door in operative relation to said source when said door is closed comprising means swingingly mounted on said door and presenting spaced parts extending across the door, a grill attaching member swingingly mounted on one of said parts adapted non-rotatably to engage a grill at one edge portion of the grill, the other of said parts having provision for rotatable attachment thereto of a grill handle portion at the opposite edge portion of the grill.

10. The combination with means forming a broiling chamber containing a source of broiling heat, of a door for said chamber mounted for swinging about a vertical axis, a support for mounting a grill on said door in operative relation to said source when said door is closed comprising means mounted on said door for swinging about a vertical axis presenting an upper part and a lower part, a drip-receiver mounted on said lower part for swinging about a vertical axis, which receiver has provision for non-rotatable attachment thereto of one edge portion of a vertically positioned grill, the upper of said parts having provision for rotatable attachment thereto of the opposite edge portion of said grill.

11. The combination with means forming a broiling chamber containing a source of broiling heat, of a door for said chamber mounted to swing about a vertical axis, a support mounted on said door for swinging about a vertical axis, means for removably and rotatably mounting a grill on said support comprising a drip-receiver mounted on said support for rotation about a vertical axis spaced from the axis of swinging of said door, releasable means for operatively connecting said drip-receiver to said support for maintaining said grill normally in closely adjacent relation to said door and, when said door is closed, in operative relation to said source.

RALLSTON M. SHERMAN.